United States Patent
Mori et al.

(10) Patent No.: US 12,342,071 B2
(45) Date of Patent: Jun. 24, 2025

(54) IMAGE CAPTURING APPARATUS THAT DETERMINES IMAGE CAPTURING MODE ACCORDING TO INSTALLATION PLACE, METHOD OF CONTROLLING SAME, AND STORAGE MEDIUM

(71) Applicant: CANON KABUSHIKI KAISHA, Tokyo (JP)

(72) Inventors: Tomokazu Mori, Kanagawa (JP); Kiyoshi Sekiguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 18/162,006

(22) Filed: Jan. 31, 2023

(65) Prior Publication Data

US 2023/0254577 A1    Aug. 10, 2023

(30) Foreign Application Priority Data

Feb. 7, 2022   (JP) .................................. 2022-017280

(51) Int. Cl.
*H04N 23/667* (2023.01)
*G06T 7/70* (2017.01)

(52) U.S. Cl.
CPC ............. *H04N 23/667* (2023.01); *G06T 7/70* (2017.01)

(58) Field of Classification Search
CPC ..................... H04N 23/667; H04N 2201/3253
USPC ...................................................... 348/220.1
See application file for complete search history.

(56) References Cited

U.S. PATENT DOCUMENTS

| | | | | |
|---|---|---|---|---|
| 2013/0329111 | A1* | 12/2013 | Desai ...................... | H04N 23/64 348/333.02 |
| 2015/0296134 | A1* | 10/2015 | Cudak ...................... | H04N 5/33 348/207.1 |
| 2016/0205305 | A1* | 7/2016 | McCarthy ............... | G01S 5/012 348/366 |
| 2016/0301860 | A1* | 10/2016 | Bostick ................ | H04N 23/661 |
| 2019/0379832 | A1* | 12/2019 | Topalli .................... | H04N 23/64 |
| 2020/0092460 | A1* | 3/2020 | Nadeau ................... | H04N 23/69 |
| 2020/0259994 | A1* | 8/2020 | Yu ........................ | H04N 1/00183 |
| 2022/0083619 | A1* | 3/2022 | Saini ........................ | H04N 23/60 |
| 2023/0171482 | A1* | 6/2023 | Roebke ..................... | H04N 5/77 348/222.1 |

FOREIGN PATENT DOCUMENTS

JP    2020-005193 A    1/2020

\* cited by examiner

*Primary Examiner* — Anthony J Daniels
(74) *Attorney, Agent, or Firm* — Cowan, Liebowitz & Latman, P.C.

(57) ABSTRACT

An image capturing apparatus includes an image capturing section for performing image capturing, an image capturing mode-determining section, and an installation place-identifying section. If an identified installation place of the apparatus and an installation place registered in advance match, the image capturing mode registered in advance in association with the identified installation place is determined as an image capturing mode to be used for image capturing. If image capturing modes are registered in advance in association with one installation place, one of the modes is selected and determined as an image capturing mode to be used for image capturing. Each mode is different from others in at least one of moving image/still image selection, an image capturing repetition period, a resolution, a frame rate, execution/non-execution of panning/tilting, and a driving range of panning/tilting.

13 Claims, 5 Drawing Sheets

FIG. 3C

```
┌─────────────────────────────────┐
│   INSTALLATION PLACE            │
│   REGISTRATION                  │
├─────────────────────────────────┤
│ Register a new installation     │
│ place.                          │
├─────────────────────────────────┤
│ • Name of the installation place│
│                                 │
│   [ Input a name         ]~304  │
│                                 │
│ • Place identification method   │
│                                 │
│   [ GPS information    ▼ ]~305  │
│                                 │
│          [ Register ]~306       │
└─────────────────────────────────┘
```

FIG. 3D

```
┌──────────────────────────────────────┐
│   IMAGE CAPTURING MODE               │
│   SETTING                            │
├──────────────────────────────────────┤
│ Set an image capturing mode          │
│ for "Place C".                       │
├──────────────────────────────────────┤
│ • Image capturing mode setting 1     │
│                                      │
│   [ Monitoring-image capturing mode ▼]~307
│                                      │
│ • Image capturing mode setting 2     │
│                                      │
│   [ --                       ▼ ]~308 │
│                                      │
│          [ Register ]~309            │
└──────────────────────────────────────┘
```

IMAGE CAPTURING APPARATUS THAT DETERMINES IMAGE CAPTURING MODE ACCORDING TO INSTALLATION PLACE, METHOD OF CONTROLLING SAME, AND STORAGE MEDIUM

BACKGROUND OF THE INVENTION

Field of the Invention

The present invention relates to an image capturing apparatus that determines an image capturing mode according to an installation place, a method of controlling the same, and a storage medium.

Description of the Related Art

There has been proposed an image capturing apparatus that is configured to perform automatic image capturing at fixed time intervals instead of performing image capturing according to a user's image capturing operation, and is used for viewing and enjoying a captured image after image capturing. This image capturing apparatus is assumed to be used not only for performing image capturing in a state worn by a user or in a state held by a user, but also for performing automatic image capturing in a state placed in a desired place.

On the other hand, as an image capturing apparatus that performs image capturing in a state placed in a desired place, there is a network camera. Japanese Laid-Open Patent Publication (Kokai) No. 2020-5193 discloses a technique for determining a delivery destination of a captured image based on delivery destination information associated with an installation place of the network camera.

In the above-described automatic image capturing of a stationary type, it is assumed that the purpose of use of image capturing is changed according to a place where the image capturing apparatus is installed. For example, there is a case where a user desires to capture an image of an unexpected moment of a family or a friend by placing the image capturing apparatus on a table in a living room at home, or there is a case where a user desires to capture an image of a suspicious person or a visitor by installing the image capturing apparatus at the entrance of a home or in a garden.

However, it is not only troublesome for a user to set an image capturing mode suitable for a purpose of use of image capturing whenever the user changes the installation place of the image capturing apparatus, but also causes the possibility of a problem of failure to capture a desired image due to a user forgetting about switching the image capturing mode. In the technique disclosed in Japanese Laid-Open Patent Publication (Kokai) No. 2020-5193, although the operation of the image capturing apparatus is determined according to an installation place, the image capturing mode is not changed according to the installation place.

SUMMARY OF THE INVENTION

The present invention provides an image capturing apparatus that automatically selects an image capturing mode according to an installation place of the image capturing apparatus and performs image capturing on which an image capturing intention of a user is reflected, a method of controlling the same, and a storage medium.

In a first aspect of the present invention, there is provided an image capturing apparatus including an image capturing section configured to perform image capturing, at least one processor, and a memory coupled to the at least one processor, the memory having instructions that, when executed by the processor, perform the operations as an image capturing mode-determining section configured to determine an image capturing mode of the image capturing section, and an installation place-identifying section configured to identify an installation place of the image capturing apparatus, wherein in a case where an installation place of the image capturing apparatus, identified by the installation place-identifying section, and an installation place registered in advance match, the image capturing mode-determining section determines an image capturing mode registered in advance in association with the identified installation place as an image capturing mode to be used for image capturing, wherein in a case where a plurality of image capturing modes have been registered in advance in association with one installation place, the image capturing mode-determining section selects one of the plurality of image capturing modes and determines the selected image capturing mode as the image capturing mode to be used for image capturing, and wherein each of the plurality of image capturing modes is different from other image capturing modes, in at least one of moving image/still image selection, an image capturing repetition period, a resolution, a frame rate, execution/non-execution of panning/tilting, and a driving range of panning/tilting.

In a second aspect of the present invention, there is provided a method of controlling an operation of an image capturing apparatus, including performing image capturing using an image capturing section, determining an image capturing mode of the image capturing section, and identifying an installation place of the image capturing apparatus, wherein the determining of an image capturing mode includes determining, in a case where the identified installation place of the image capturing apparatus and an installation place registered in advance match, an image capturing mode registered in advance in association with the identified installation place as an image capturing mode to be used for image capturing, wherein the determining of an image capturing mode includes, in a case where a plurality of image capturing modes have been registered in advance in association with one installation place, selecting one of the plurality of image capturing modes and determining the selected image capturing mode as the image capturing mode to be used for image capturing, and wherein each of the plurality of image capturing modes is different from other image capturing modes, in at least one of moving image/still image selection, an image capturing repetition period, a resolution, a frame rate, execution/non-execution of panning/tilting, and a driving range of panning/tilting.

According to the present invention, it is possible to provide an image capturing apparatus that automatically selects an image capturing mode according to an installation place of the image capturing apparatus and performs image capturing on which an image capturing intention of a user is reflected, a method of controlling the same, and a storage medium.

Further features of the present invention will become apparent from the following description of exemplary embodiments (with reference to the attached drawings).

BRIEF DESCRIPTION OF THE DRAWINGS

FIGS. 3A to 3D are explanatory views each showing a user interface displayed on the operation terminal when setting and registering an image capturing mode.

DESCRIPTION OF THE EMBODIMENTS

The present invention will now be described in detail below with reference to the accompanying drawings showing embodiments thereof. The components in the following embodiments are described only by way of example, and are by no means intended to limit the scope of the present invention to them. First, a first embodiment of the present invention will be described.

Figure 1:
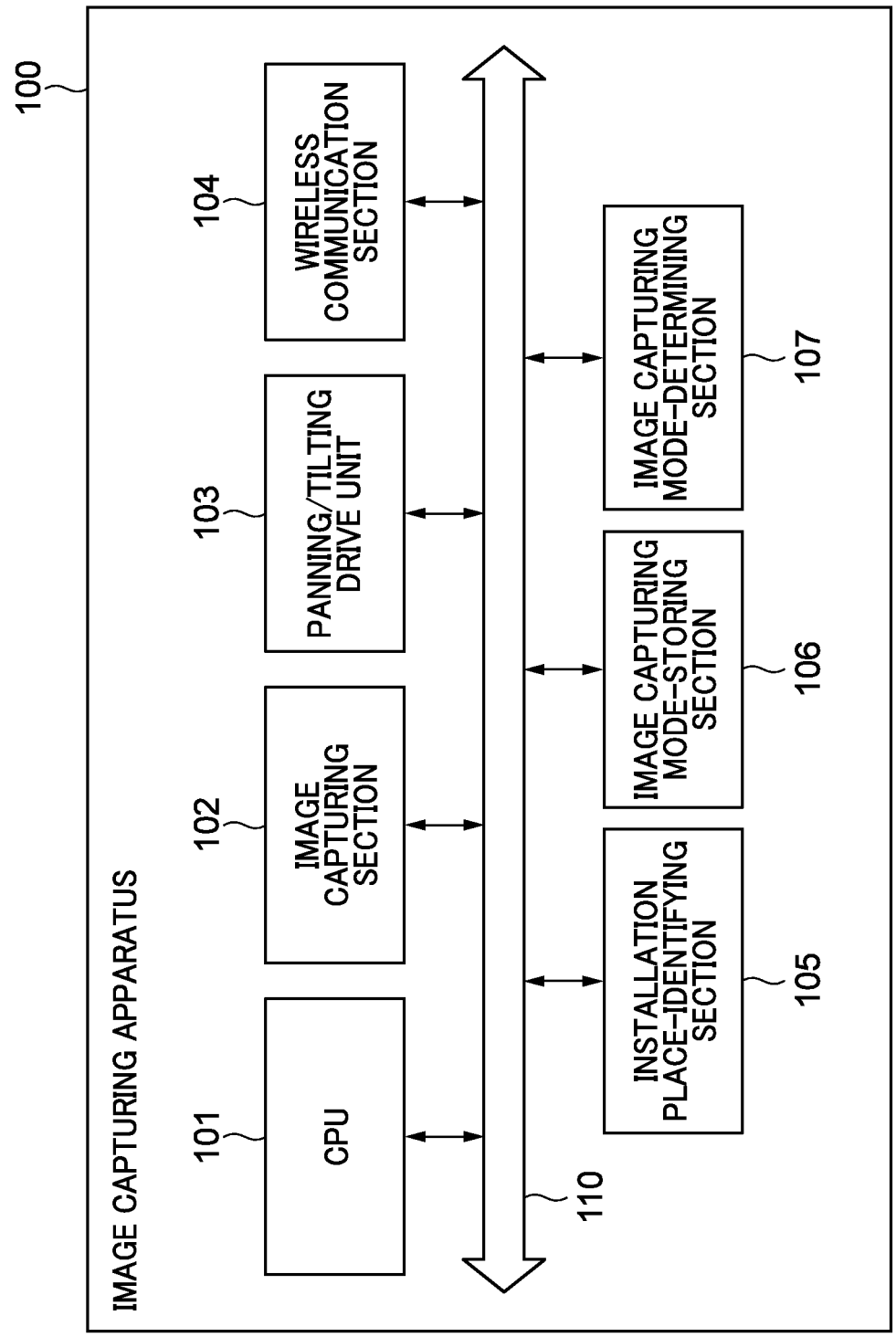
FIG. 1 is a functional block diagram of an image capturing apparatus according to embodiments of the present invention.

FIG. 1 is a functional block diagram of an image capturing apparatus 100 according to the first embodiment of the present invention. As shown in FIG. 1, the image capturing apparatus 100 includes a CPU 101, an image capturing section 102, a panning/tilting drive unit 103, a wireless communication section 104, an installation place-identifying section 105, an image capturing mode-storing section 106, and an image capturing mode-determining section 107. The components of the image capturing apparatus 100 shown in FIG. 1 are connected to a system bus 110 and configured to be capable of transmitting and receiving predetermined information between the components.

The CPU 101 performs centralized control of the operation of the image capturing apparatus 100 by executing programs recorded in a ROM or an HDD, not shown. The functions of the image capturing apparatus 100 are realized by the CPU 101 executing the programs. The image capturing section 102 is comprised of a lens unit, an image sensor, and an analog-to-digital converter circuit, none of which are shown, and performs image capturing. The panning/tilting drive unit 103 is comprised of a motor as a drive source, a panning/tilting angle detection section for detecting a panning/tilting angle, none of which are shown, and rotates a panning/tilting mechanism, not shown, of the image capturing apparatus 100 in a panning direction and a tilting direction. The wireless communication section 104 performs wireless communication with an operation terminal 200, described hereinafter, to transmit and receive various control data and the like to and from the operation terminal 200.

The installation place-identifying section 105 identifies an installation place of the image capturing apparatus 100 using one of methods, described hereinafter. The image capturing mode-storing section 106 stores a plurality of types of image capturing modes for performing image capturing by the image capturing section 102. Note that it is assumed that the image capturing apparatus 100 of the present embodiment includes image capturing conditions of "moving image/still image selection", "image capturing repetition period", "resolution", "frame rate", "execution/non-execution of panning/tilting", "driving range of panning/tilting", and so forth, with respect to each of the plurality of types of image capturing modes. The image capturing mode-determining section 107 selects one of the plurality of types of image capturing modes stored in the image capturing mode-storing section 106. Image capturing is performed by the image capturing section 102 in the selected image capturing mode.

Figure 2:
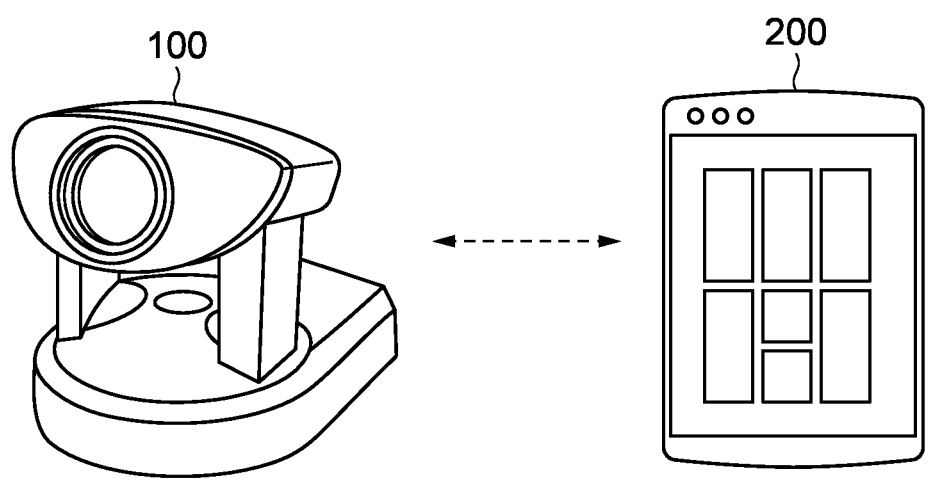
FIG. 2 is a schematic explanatory view useful in explaining a method of communication between the image capturing apparatus according to the embodiments of the present invention and an operation terminal.

Next, an example of an operation performed by a user for setting and registering an image capturing mode of the image capturing section 102 for the image capturing apparatus 100 with respect to each installation place will be described with reference to FIGS. 2 and 3A to 3D. FIG. 2 is a schematic explanatory view useful in explaining communication between the image capturing apparatus 100 and the operation terminal 200. The image capturing apparatus 100 and the operation terminal 200 can communicate with each other using wireless communication, such as "Bluetooth (registered trademark)" or "wireless LAN". The user can register various settings of the image capturing apparatus 100 by operating the operation terminal 200. Examples of the operation terminal 200 include a smartphone, a dedicated remote controller, and a PC.

Figure 3A:
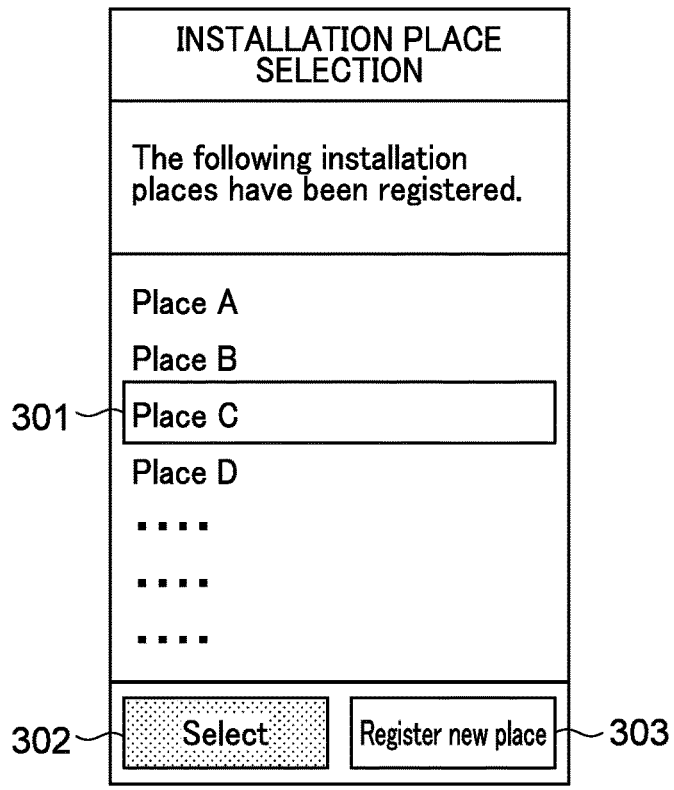

FIGS. 3A to 3D are explanatory views each showing a "user interface" displayed when a user sets and registers an image capturing mode of the image capturing section 102 of the image capturing apparatus 100 using the operation terminal 200. First, the user selects an installation place for which an image capturing mode is set, on a screen displaying "installation place selection", shown in FIG. 3A. At this time, a list of installation places which have already been registered is displayed on the display screen as shown in FIG. 3A. The user sets a cursor 301 onto a desired installation place of the list and operates a selection button 302. With this operation, the user can select the "installation place".

Figure 3B:
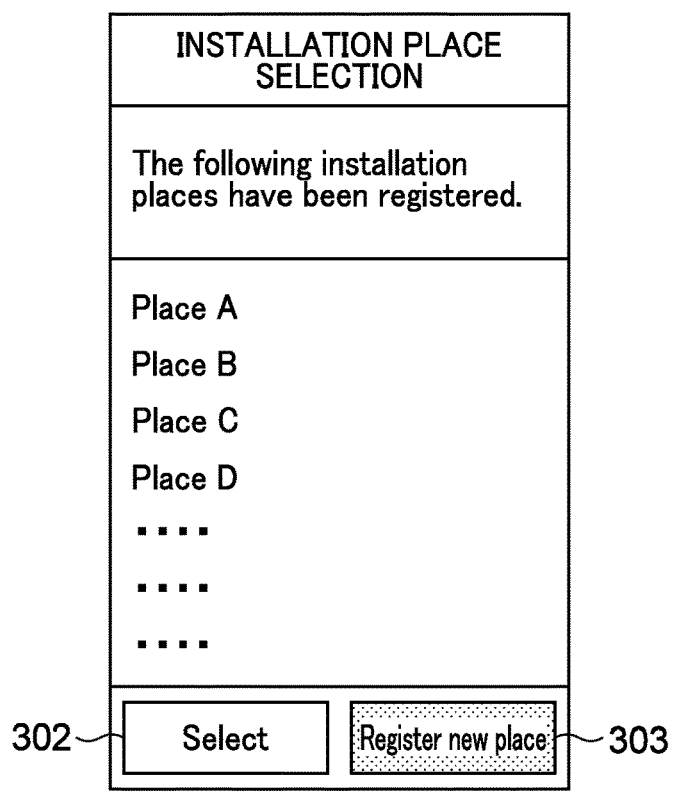

In a case where a desired installation place is not included in the displayed list of "installation places" which have already been registered, the user operates a new registration button 303 as shown in FIG. 3B. With this operation, the screen shifts to a screen displaying "installation place registration" shown in FIG. 3C. Then, the user registers the desired installation place for which the user desires to set an image capturing mode. When registering the installation place, the user inputs a desired name in a box 304 where the name of an installation place is to be input. Further, the user selects one of mark information, a related device, and GPS information for the set installation place from a pull-down menu 305 of installation place-identifying methods, and operates a registration button 306. With this, the name of the installation place and the place identifying method are registered.

The mark information refers to marking information, such as a QR code (registered trademark) and a barcode. The user registers the mark information in a state associated with an installation place in advance, whereby the installation place-identifying section 105 can identify the installation place of the image capturing apparatus 100 by detecting the mark information associated therewith. Note that the mark information is assumed to be provided in advance in the installation place. For example, the installation place-identifying section 105 automatically reads the mark information and determines whether or not the read mark information and the mark information registered in advance match. Then, if it is determined that the items of the mark information match, the installation place-identifying section 105 identifies the position where this mark information exists as the installation place of the image capturing apparatus 100.

That is, the installation place-identifying section 105 identifies the installation place of the image capturing apparatus 100, based on the mark information registered in advance for identifying the installation place.

The related device is an information terminal, such as a smartphone and a wearable device. The user registers a related device in a state associated with an installation place in advance, whereby the installation place-identifying section 105 determines whether or not the related device exists in the vicinity of the image capturing apparatus 100. Then, if it is determined that the related device exists in the vicinity of the image capturing apparatus 100, the installation place-identifying section 105 identifies that the installation place of the image capturing apparatus 100 is the installation place associated with the related device. Note that it is assumed that the related device is placed in the installation place, and that the related device and the image capturing apparatus 100 can communicate with each other.

For example, in a case where short-distance communication with the related device is enabled by the wireless communication section 104, the installation place-identifying section 105 identifies the installation place of the related device as the installation place of the image capturing apparatus 100. That is, if it is determined that a predetermined device registered in a state associated with an installation place registered in advance exists in the vicinity of the image capturing apparatus 100, the installation place-identifying section 105 identifies the installation place with which the predetermined device is associated as the installation place of the image capturing apparatus 100.

The GPS information is position information using global position system (GPS). The installation place-identifying section 105 identifies the installation place of the image capturing apparatus 100 by acquiring the GPS information. That is, the installation place-identifying section 105 identifies the installation place of the image capturing apparatus 100 based on the GPS information. Note that although in the present embodiment, the description is given of the example in which one of the mark information, the related device, and the GPS information is selected, the image capturing apparatus 100 may be configured such that a plurality of information items can be selected.

Further, it is also possible to identify an installation place by detecting surrounding sound information using a surrounding sound detection section, not shown, and analyzing the detected sound information using the installation place-identifying section 105. For example, if it is determined that the sound information detected by the surrounding sound detection section is the same as a pet call registered with the installation place-identifying section 105 in advance, the installation place-identifying section 105 identifies the installation place by determining that the image capturing apparatus 100 is installed in the place where the pet is present. That is, the image capturing apparatus 100 includes the surrounding sound detection section for detecting surrounding sound information, and the installation place-identifying section 105 can identify the installation place of the image capturing apparatus 100 based on the detected sound information.

Finally, the user sets and registers an image capturing mode with respect to the installation place selected in FIG. 3A on a screen displaying image capturing mode setting, shown in FIG. 3D. In the present embodiment, a plurality of types of image capturing modes can be set for one installation place. Therefore, as shown in FIG. 3D, a plurality of image capturing mode-setting boxes (307 and 308) are displayed.

Note that FIG. 3D shows an example of setting and registering a "monitor-image capturing mode" for a "place C". Then, when the user operates a registration button 309, registration of the set contents is performed. Thus, one or more image capturing modes can be registered for one installation place. Further, the information set on the operation terminal 200 is received by the wireless communication section 104. The CPU 101 stores the information received by the wireless communication section 104 in the image capturing mode-storing section 106 via the system bus 110 in a nonvolatile state.

Figure 4:
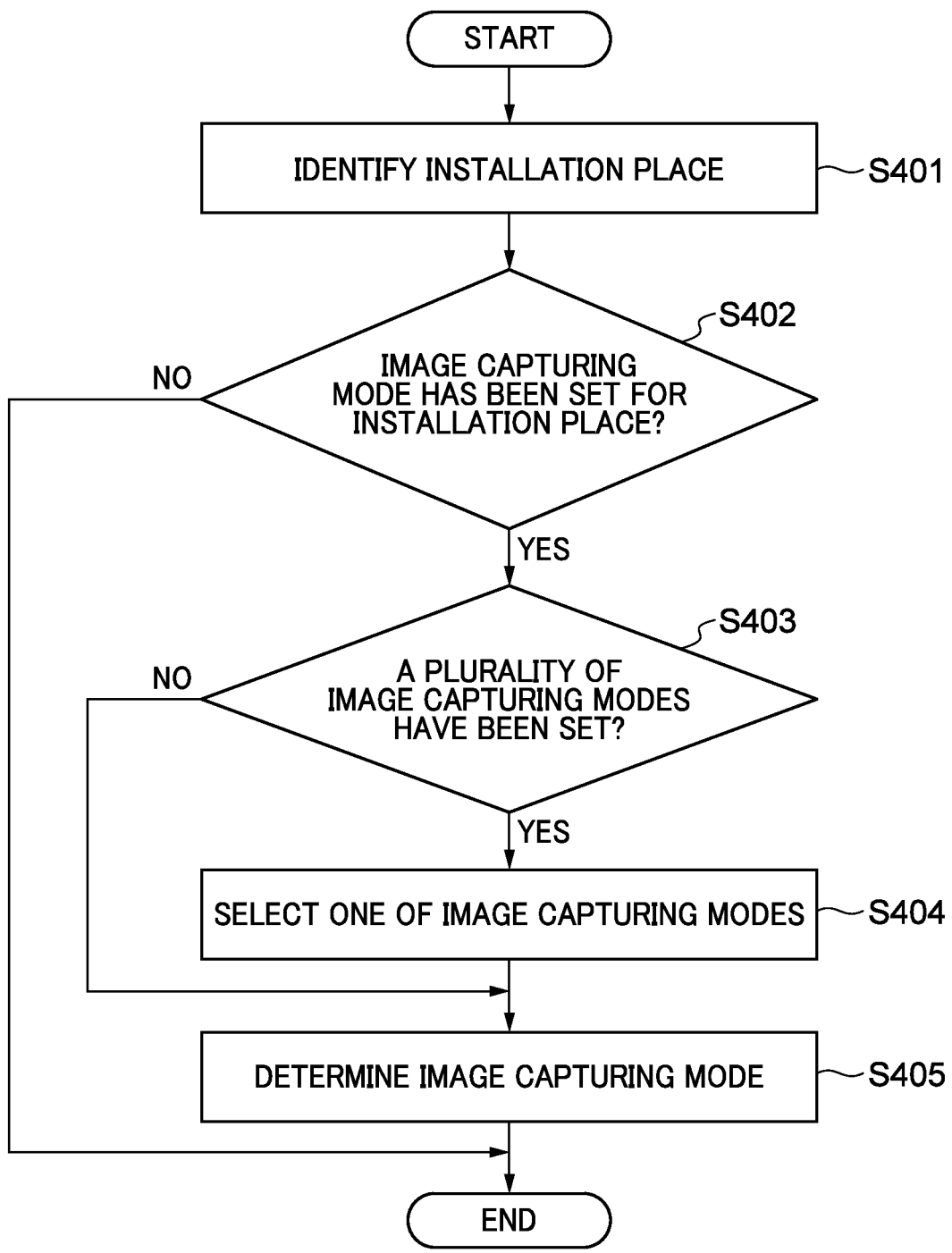
FIG. 4 is a flowchart of an image capturing mode determination process for determining an image capturing mode according to an installation place.

FIG. 4 is a flowchart of an image capturing mode determination process performed by the image capturing apparatus 100. It is assumed that the setting of the image capturing mode for each installation place, described with reference to FIGS. 3A to 3D, has already been performed by the user. Therefore, the image capturing mode-storing section 106 stores one or more installation places of the image capturing apparatus 100 and one or more image capturing modes associated with each installation place. Note that it is assumed here that a plurality of installation places of the image capturing apparatus 100 have been set. That is, the image capturing mode-storing section 106 stores one or more image capturing modes for each of the plurality of installation places.

First, in a step S401, the installation place-identifying section 105 identifies the installation place of the image capturing apparatus 100 based on any of the information items of the mark information, the related device, and the GPS information, described above.

Next, in a step S402, the CPU 101 determines whether or not an image capturing mode has been set for the installation place identified in the step S401. If it is determined in the step S402 that an image capturing mode has not been set (NO to the step S402), the present process is immediately terminated. On the other hand, if it is determined in the step S402 that an image capturing mode has been set (YES to the step S402), the process proceeds to a step S403.

Next, in the step S403, the CPU 101 determines whether or not a plurality of image capturing modes have been set for the identified installation place, based on the contents stored in the image capturing mode-storing section 106. If it is determined in the step S403 that only one image capturing mode has been set (NO to the step S403), the process proceeds to a step S405.

On the other hand, if it is determined in the step S403 that a plurality of image capturing modes have been set, based on the contents stored in the image capturing mode-storing section 106 (YES to the step S403), the process proceeds to a step S404. Then, in the step S404, the image capturing mode-determining section 107 selects one image capturing mode out of the plurality of image capturing modes which have been set, as the image capturing mode of the image capturing section 102 for the identified installation place of the image capturing apparatus 100, and then the process proceeds to the step S405.

Here, examples of an image capturing mode selection method performed by the image capturing mode-determining section 107 will be described. In the present embodiment, the plurality of image capturing modes include at least two image capturing modes of a life log-image capturing mode (first image capturing mode) and the monitor-image capturing mode (second image capturing mode). The life log-image capturing mode is an image capturing mode for use in capturing a life log image by capturing a still image of a person or object around the image capturing apparatus 100 at a fixed repetition period. Further, the monitor-image capturing mode is an image capturing mode for always capturing a moving image so as to monitor the movement of a suspicious person, a child, an animal, or the like. Then, the image capturing mode-determining section 107 selects one of the life log-image capturing mode and the monitor-image capturing mode based on a determination condition set for each installation place.

Here, it is assumed that the life log-image capturing mode and the monitor-image capturing mode have been set and registered for each of an indoor room A and an outdoor garden B, by way of example. Further, it is assumed that a use frequency is the determination condition for the indoor room A, and a use time zone is the determination condition for the outdoor garden B.

In this case, for the indoor room A, an image capturing mode which has been frequently used is selected. For example, in a case where the life log-image capturing mode has been used in many cases, and the monitor-image capturing mode has been used with a frequency lower than the frequency of the life log-image capturing mode, the life log-image capturing mode is selected. On the other hand, for the outdoor garden B, the life log-image capturing mode is selected in the daytime, and the monitor-image capturing mode is selected in the nighttime.

Further, as the determination condition for the indoor room A, an illuminance value or an operating state of a device in the surrounding area can be set. In a case where the illuminance value is set as the determination condition, when the illuminance value is higher than a predetermined value, the life log-image capturing mode is determined as the image capturing mode, whereas when the illuminance value is not higher than the predetermined value (it is judged that the user is absent), the monitor-image capturing mode is determined as the image capturing mode. Further, in a case where the operating state of the device in the surrounding area is set as the determination condition, when the operation terminal 200 exists around the image capturing apparatus 100, the life log-image capturing mode is determined as the image capturing mode. On the other hand, when the operation terminal 200 does not exist (it is judged that the user is absent), the monitor-image capturing mode is determined as the image capturing mode.

The image capturing mode-determining section 107 is thus configured to be capable of defining a different selection determination condition on an installation place basis. Note that in the present embodiment, if the installation place is indoor, one of the use frequency, the illuminance value, and the operating state of the device in the surrounding area is set as the selection determination condition. Although if the installation place of the image capturing apparatus 100 is outdoor, the use time zone is set as the selection determination condition, this is not limitative. For example, the use time zone may be set as the selection determination condition for the indoor room A, and the use frequency may be set as the selection determination condition for the outdoor garden B. Thus, the selection determination condition is set to one of the use frequency, the use time zone, the illuminance value, the operating state of the device in the surrounding area, and so forth.

The image capturing mode is selected in the step S404 as described above, and then the process proceeds to the step S405. In the step S405, the selected image capturing mode is determined as the image capturing mode of the image capturing section 102 for the identified installation place of the image capturing apparatus 100, followed by terminating the present process. Note that the selection determination condition may be differentiated according to an installation place set in advance.

As described above, according to the present embodiment, an image capturing mode set by a user for each installation place in advance is automatically selected by the image capturing apparatus 100, and image capturing is performed according to the selected image capturing mode. This makes it possible to perform image capturing in a state in which the image capturing intention of the user is positively reflected without time and effort, even when the installation place of the image capturing apparatus 100 is changed. Note that each of the plurality of image capturing modes is determined according to one or more image capturing conditions of the moving image/still image selection, the image capturing repetition period, the resolution, the frame rate, the execution/non-execution of panning/tilting, the driving range of panning/tilting, and so forth.

Next, a second embodiment of the present invention will be described. The image capturing apparatus 100 according to the second embodiment has the same hardware configuration as that of the image capturing apparatus 100 according to the first embodiment. Therefore, description of blocks that perform the same operations as the blocks in the first embodiment, shown in FIG. 1, is omitted.

Note that in the present embodiment, there is used a function of enabling image capturing in a desired direction even in the same installation position, by rotating the image capturing apparatus 100 including the image capturing section 102 in a panning/tilting direction using the panning/tilting mechanism driven by the panning/tilting drive unit 103.

Here, as an example of the image capturing apparatus 100 driven for rotation in the panning/tilting direction by the panning/tilting drive unit 103, the image capturing apparatus 100 installed in a car (vehicle) is assumed. In a case where the image capturing apparatus 100 is installed in a car, it is envisaged that a user captures an image of a front side view through a windshield using the image capturing apparatus 100 as a drive recorder. This image capturing mode is hereinafter referred to as the drive image capturing mode.

In a case where the image capturing apparatus 100 according to the present embodiment is set to the drive image capturing mode, the panning/tilting drive unit 103 operates to automatically perform panning/tilting driving in a vehicle running direction after the vehicle starts to run. With this, the orientation of the image capturing apparatus 100 is changed such that the image capturing apparatus 100 can capture an image of the front side view.

Then, in this state, the panning/tilting drive unit 103 stops rotation of the image capturing apparatus 100 in the panning/tilting direction. With this, the orientation of the image capturing apparatus 100 is set in the vehicle running direction and the image capturing apparatus 100 can always capture an image of the front side view through the windshield. Note that by setting the drive image capturing mode for a predetermined car A (installation place) in advance, the following operation is performed: In a case where the image capturing apparatus 100 is installed in the car A, the drive image capturing mode is set by the image capturing mode-determining section 107, and the image capturing apparatus 100 is automatically driven to rotate in the panning/tilting direction and stop rotation thereof in the panning/tilting direction.

As described above, the image capturing apparatus 100 of the present embodiment is capable of changing execution/non-execution of panning/tilting and the driving range of panning/tilting according to the installation place. Note that in the above description, the operation of the image capturing apparatus 100 is described assuming that the image capturing apparatus 100 is installed in a car. However, this is not limitative, but the operation of changing the execution/non-execution of panning/tilting and the driving range of panning/tilting can be performed according to a desired installation place.

According to the first embodiment, the image capturing apparatus 100 includes the image capturing section 102 configured to perform image capturing, the image capturing mode-determining section 107 configured to determine an image capturing mode of the image capturing section 102, and the installation place-identifying section 105 configured to identify an installation place of the image capturing apparatus 100. Then, in a case where the installation place of the image capturing apparatus 100, identified by the installation place-identifying section 105, and an installation place registered in advance match, the image capturing mode-determining section 107 performs the following operation: The image capturing mode-determining section 107 determines an image capturing mode registered in advance in association with the identified installation place as an image capturing mode to be used for image capturing.

With this, it is possible to realize the image capturing apparatus 100 that automatically selects an image capturing mode associated with an installation place of the image capturing apparatus 100 and performs image capturing on which an image capturing intention of a user is reflected.

According to the second embodiment, in a case where an installation place of the image capturing apparatus 100, identified by the installation place-identifying section 105, and an installation place registered in advance match, the panning/tilting drive unit 103 configured to control driving of the panning/tilting mechanism (not shown) for rotating the image capturing apparatus 100 in the panning/tilting direction performs the following operation: The panning/tilting drive unit 103 controls driving of the panning/tilting mechanism, based on the panning/tilting information including the execution/non-execution of panning/tilting and the driving range of panning/tilting, which are registered in advance in association with the identified installation place. Further, the panning/tilting information can be differentiated for each of the one or more image capturing modes registered in advance in association with each installation place registered in advance.

With this, it is possible to change the execution/non-execution of panning/tilting and the driving range of panning/tilting according to an installation place and an image capturing mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-017280 filed Feb. 7, 2022, which is hereby incorporated by reference herein in its entirety.

What is claimed is:

1. An image capturing apparatus comprising:
an image capturing section configured to perform image capturing;
at least one processor; and
a memory coupled to the at least one processor, the memory having instructions that, when executed by the processor, perform the operations as:
an image capturing mode-determining section configured to determine an image capturing mode of the image capturing section; and
an installation place-identifying section configured to identify an installation place of the image capturing apparatus,
wherein in a case where an installation place of the image capturing apparatus, identified by the installation place-identifying section, and an installation place registered in advance match, the image capturing mode-determining section determines an image capturing mode registered in advance in association with the identified installation place as an image capturing mode to be used for image capturing,
wherein in a case where a plurality of image capturing modes have been registered in advance in association with one installation place, the image capturing mode-determining section selects one of the plurality of image capturing modes and
wherein the plurality of image capturing modes includes a first image capturing mode in which still image capturing is performed at a predetermined repetition period, and a second image capturing mode in which moving image capturing is always performed to monitor around the image capturing apparatus.

2. The image capturing apparatus according to claim 1, wherein the installation place-identifying section identifies the installation place of the image capturing apparatus based on mark information for identifying the installation place registered in advance.

3. The image capturing apparatus according to claim 1, wherein in a case where it is determined that a predetermined device registered in association with an installation place registered in advance exists in the vicinity of the image capturing apparatus, the installation place-identifying section identifies the installation place with which the predetermined device is associated, as the installation place of the image capturing apparatus.

4. The image capturing apparatus according to claim 1, wherein the installation place-identifying section identifies the installation place of the image capturing apparatus based on GPS information.

5. The image capturing apparatus according to claim 1, wherein the installation place-identifying section identifies the installation place of the image capturing apparatus based on surrounding sound information.

6. The image capturing apparatus according to claim 1, the first image capturing mode is different from the second image capturing mode, in at least one of a resolution, execution/non-execution of panning/tilting, and a driving range of panning/tilting.

7. The image capturing apparatus according to claim 1, wherein when selecting one image capturing mode out of the plurality of image capturing modes, the image capturing mode-determining section selects an image capturing mode based on a selection determination condition and determines the selected image capturing mode as an image capturing mode to be used for image capturing.

8. The image capturing apparatus according to claim 7, wherein the selection determination condition is differentiated according to an installation place registered in advance.

9. The image capturing apparatus according to claim 7, wherein the selection determination condition is one of a use frequency, a use time zone, an illuminance value, and an operating state of a device in an area surrounding the image capturing apparatus.

10. The image capturing apparatus according to claim 1, wherein the instructions, when executed by the processor, perform the operations further as a panning/tilting drive unit configured to control driving of a panning/tilting mechanism for rotating the image capturing apparatus in a panning/tilting direction, and
   wherein in a case where the installation place of the image capturing apparatus, identified by the installation place-identifying section, and the installation place registered in advance match, the panning/tilting drive unit controls driving of the panning/tilting mechanism based on panning/tilting information including execution/non-execution of panning/tilting and a driving range of panning/tilting, which is registered in advance in association with the identified installation place.

11. The image capturing apparatus according to claim 10, wherein the panning/tilting information is different for each of the one or more image capturing modes registered in advance in association with an installation place registered in advance.

12. A method of controlling an operation of an image capturing apparatus, comprising:
   performing image capturing using an image capturing section;
   determining an image capturing mode of the image capturing section; and
   identifying an installation place of the image capturing apparatus,
   wherein the determining of an image capturing mode includes determining, in a case where the identified installation place of the image capturing apparatus and an installation place registered in advance match, an image capturing mode registered in advance in association with the identified installation place as an image capturing mode to be used for image capturing,
   wherein the determining of an image capturing mode includes, in a case where a plurality of image capturing modes have been registered in advance in association with one installation place, selecting one of the plurality of image capturing modes and determining the selected image capturing mode as the image capturing mode to be used for image capturing, and
   wherein the plurality of image capturing modes includes a first image capturing mode in which still image capturing is performed at a predetermined repetition period, and a second image capturing mode in which moving image capturing is always performed to monitor around the image capturing apparatus.

13. A non-transitory computer-readable storage medium storing a program for causing a computer to execute a method of controlling an operation of an image capturing apparatus,
   wherein the method comprises:
   performing image capturing using an image capturing section;
   determining an image capturing mode of the image capturing section; and
   identifying an installation place of the image capturing apparatus,
   wherein the determining of an image capturing mode includes determining, in a case where the identified installation place of the image capturing apparatus and an installation place registered in advance match, an image capturing mode registered in advance in association with the identified installation place as an image capturing mode to be used for image capturing,
   wherein the determining of an image capturing mode includes, in a case where a plurality of image capturing modes have been registered in advance in association with one installation place, selecting one of the plurality of image capturing modes and determining the selected image capturing mode as the image capturing mode to be used for image capturing, and
   wherein the plurality of image capturing modes includes a first image capturing mode in which still image capturing is performed at a predetermined repetition period, and a second image capturing mode in which moving image capturing is always performed to monitor around the image capturing apparatus.

* * * * *